(12) United States Patent
Silkin et al.

(10) Patent No.: US 9,942,560 B2
(45) Date of Patent: Apr. 10, 2018

(54) ENCODING SCREEN CAPTURE DATA

(71) Applicant: Microsoft Technology Licensing, LLC, Redmond, WA (US)

(72) Inventors: Sergey Silkin, Nacka (SE); Sergey Sablin, Bromma (SE); You Zhou, Sammamish, WA (US); Chih-Lung Lin, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 14/530,616

(22) Filed: Oct. 31, 2014

(65) Prior Publication Data

US 2015/0195557 A1 Jul. 9, 2015

Related U.S. Application Data

(60) Provisional application No. 61/925,090, filed on Jan. 8, 2014.

(51) Int. Cl.
*H04N 19/51* (2014.01)
*H04N 19/42* (2014.01)
(Continued)

(52) U.S. Cl.
CPC .......... *H04N 19/42* (2014.11); *H04N 19/109* (2014.11); *H04N 19/136* (2014.11); *H04N 19/174* (2014.11); *H04N 19/523* (2014.11)

(58) Field of Classification Search
CPC .... H04N 19/51; H04N 19/109; H04N 19/136; H04N 19/174; H04N 19/176; H04N 19/523
See application file for complete search history.

(56) References Cited

U.S. PATENT DOCUMENTS 4,661,849 A 4/1987 Hinman
4,661,853 A 4/1987 Roeder et al.
(Continued)

FOREIGN PATENT DOCUMENTS

EP 0535746 4/1993
EP 0863675 9/1998
(Continued)

OTHER PUBLICATIONS

ITU-T; Series H: Audiovisual and Multimedia Systems Infrastructure of audiovisual services—Coding of moving video—Advanced video coding for generic audiovisual services—Apr. 2013.*
(Continued)

*Primary Examiner* — Sath V Perungavoor
*Assistant Examiner* — Philip Dang
(74) *Attorney, Agent, or Firm* — Klarquist Sparkman, LLP

(57) ABSTRACT

An input of an encoder receives moving image data comprising a sequence of frames to be encoded, each frame comprising a plurality of blocks in two dimensions with each block comprising a plurality of pixels in those two dimensions. A motion prediction module performs encoding by, for at least part of each of a plurality of said frames, coding each block relative to a respective reference portion of another frame of the sequence, with the respective reference portion being offset from the block by a respective motion vector. According to the present disclosure, the moving image data of this plurality of frames comprises a screen capture stream, and the motion prediction module is configured to restrict each of the motion vectors of the screen capture stream to an integer number of pixels in at least one of said dimensions.

21 Claims, 4 Drawing Sheets

(51) Int. Cl.
  *H04N 19/109* (2014.01)
  *H04N 19/136* (2014.01)
  *H04N 19/174* (2014.01)
  *H04N 19/523* (2014.01)

(56) References Cited

U.S. PATENT DOCUMENTS

| | | |
|---|---|---|
| 4,695,882 A | 9/1987 | Wada et al. |
| 4,862,267 A | 8/1989 | Gillard et al. |
| 4,864,393 A | 9/1989 | Harradine et al. |
| 5,103,306 A | 4/1992 | Weiman et al. |
| 5,175,618 A | 12/1992 | Ueda |
| 5,298,991 A | 3/1994 | Yagasaki et al. |
| 5,384,869 A | 1/1995 | Wilkinson et al. |
| 5,424,779 A | 6/1995 | Odaka |
| 5,428,396 A | 6/1995 | Yagasaki |
| 5,442,400 A | 8/1995 | Sun |
| 5,467,136 A | 11/1995 | Odaka |
| 5,477,272 A | 12/1995 | Zhang |
| 5,491,523 A | 2/1996 | Sato |
| 5,559,557 A | 9/1996 | Kato |
| 5,565,922 A | 10/1996 | Krause |
| 5,594,504 A | 1/1997 | Ebrahimi |
| 5,594,813 A | 1/1997 | Fandrianto et al. |
| 5,623,311 A | 4/1997 | Phillips et al. |
| 5,659,365 A | 8/1997 | Wilkinson |
| 5,692,063 A | 11/1997 | Lee et al. |
| 5,701,164 A | 12/1997 | Kato |
| 5,768,537 A | 6/1998 | Butter et al. |
| 5,784,175 A | 7/1998 | Lee |
| 5,787,203 A | 7/1998 | Lee et al. |
| 5,796,855 A | 8/1998 | Lee |
| 5,799,113 A | 8/1998 | Lee |
| 5,825,929 A | 10/1998 | Chen et al. |
| 5,844,613 A | 12/1998 | Chaddha |
| 5,847,776 A | 12/1998 | Khmelnitsky |
| 5,874,995 A | 2/1999 | Naimpally et al. |
| 5,901,248 A | 5/1999 | Fandrianto et al. |
| 5,929,940 A | 7/1999 | Jeannin |
| 5,946,042 A | 8/1999 | Kato |
| 5,959,673 A | 9/1999 | Lee |
| 5,963,259 A | 10/1999 | Nakaya et al. |
| 5,970,173 A | 10/1999 | Lee et al. |
| 5,973,755 A | 10/1999 | Gabriel |
| 5,982,438 A | 11/1999 | Lin et al. |
| 5,991,447 A | 11/1999 | Eifrig et al. |
| 6,005,980 A | 12/1999 | Eifring et al. |
| 6,011,596 A | 1/2000 | Burl |
| 6,020,934 A | 2/2000 | Greenfield et al. |
| 6,040,863 A | 3/2000 | Kato |
| 6,058,212 A | 5/2000 | Yokohama |
| 6,067,322 A | 5/2000 | Wang |
| RE36,822 E | 8/2000 | Sugiyama |
| 6,130,963 A | 10/2000 | Uz et al. |
| 6,201,927 B1 | 3/2001 | Comer et al. |
| 6,205,176 B1 | 3/2001 | Sugiyama |
| 6,219,070 B1 | 4/2001 | Baker et al. |
| 6,219,464 B1 | 4/2001 | Greggain et al. |
| 6,233,017 B1 | 5/2001 | Chaddha |
| RE37,222 E | 6/2001 | Yonemitsu |
| 6,259,741 B1 | 7/2001 | Chen et al. |
| 6,266,091 B1 | 7/2001 | Chen et al. |
| 6,271,885 B2 | 8/2001 | Sugiyama |
| 6,281,942 B1 | 8/2001 | Wang |
| 6,282,243 B1 | 8/2001 | Kazui et al. |
| 6,295,376 B1 | 9/2001 | Nakaya |
| 6,307,887 B1 | 10/2001 | Gabriel |
| 6,310,918 B1 | 10/2001 | Saha et al. |
| 6,320,593 B1 | 11/2001 | Sachs et al. |
| 6,324,216 B1 | 11/2001 | Igarashi |
| 6,337,881 B1 | 1/2002 | Chaddha |
| 6,339,656 B1 | 1/2002 | Marui |
| 6,377,628 B1 | 4/2002 | Schultz et al. |
| 6,381,279 B1 | 4/2002 | Taubman |
| 6,396,876 B1 | 5/2002 | Babonneau et al. |
| 6,404,813 B1 | 6/2002 | Haskell et al. |
| 6,418,166 B1 | 7/2002 | Wu et al. |
| 6,430,316 B1 | 8/2002 | Wilkinson |
| 6,441,842 B1 | 8/2002 | Fandrianto et al. |
| 6,496,608 B1 | 12/2002 | Chui |
| 6,529,632 B1 | 3/2003 | Nakaya et al. |
| 6,539,056 B1 | 3/2003 | Sato et al. |
| 6,647,061 B1 | 11/2003 | Panusopone et al. |
| 6,650,781 B2 | 11/2003 | Nakaya |
| 6,661,470 B1 | 12/2003 | Kawakami et al. |
| 6,728,317 B1 | 4/2004 | Demos |
| 6,765,965 B1 | 7/2004 | Hanami et al. |
| RE38,563 E | 8/2004 | Eifrig et al. |
| 6,915,013 B2 | 7/2005 | Nakaya |
| 6,950,469 B2 | 9/2005 | Karczewicz et al. |
| 6,968,008 B1 | 11/2005 | Ribas-Corbera et al. |
| 6,980,695 B2 * | 12/2005 | Mehrotra ............... H04N 19/46 375/240.03 |
| 6,983,018 B1 | 1/2006 | Lin et al. |
| 7,016,547 B1 * | 3/2006 | Smirnov ................. H03M 7/40 375/E7.144 |
| 7,072,512 B2 * | 7/2006 | Mehrotra ................. G06T 9/00 375/E7.077 |
| 7,110,459 B2 | 9/2006 | Srinivasan |
| 7,200,276 B2 | 4/2007 | Mehrortra |
| 7,224,731 B2 * | 5/2007 | Mehrotra ............... H04N 5/145 348/E5.066 |
| 7,813,570 B2 | 10/2010 | Shen et al. |
| 8,130,825 B2 | 3/2012 | Scheuermann |
| 8,130,828 B2 | 3/2012 | Hsu et al. |
| 8,155,195 B2 | 4/2012 | Regunathan et al. |
| 8,266,665 B2 * | 9/2012 | Beyabani ............... H04N 17/004 725/109 |
| 8,271,618 B1 * | 9/2012 | Kridlo .................... H04L 67/06 709/219 |
| 8,279,936 B1 | 10/2012 | Cahalan et al. |
| 8,498,493 B1 * | 7/2013 | Choudhary ............ H04N 19/52 375/240.16 |
| 2001/0050957 A1 | 12/2001 | Nakaya et al. |
| 2002/0186890 A1 | 12/2002 | Lee et al. |
| 2003/0095603 A1 | 5/2003 | Lan et al. |
| 2003/0112864 A1 | 6/2003 | Karczewicz et al. |
| 2003/0142748 A1 | 7/2003 | Tourapis et al. |
| 2003/0152146 A1 | 8/2003 | Lin et al. |
| 2003/0156646 A1 | 8/2003 | Hsu |
| 2003/0202705 A1 | 10/2003 | Sun |
| 2004/0001544 A1 * | 1/2004 | Mehrotra ............... H04N 5/145 375/240.1 |
| 2005/0013498 A1 | 1/2005 | Srinivasan |
| 2005/0036700 A1 | 2/2005 | Nakaya |
| 2005/0036759 A1 | 2/2005 | Lin et al. |
| 2005/0069212 A1 | 3/2005 | Bottreau et al. |
| 2005/0220190 A1 | 10/2005 | Ha et al. |
| 2005/0226335 A1 | 10/2005 | Lee et al. |
| 2006/0056513 A1 | 3/2006 | Shen et al. |
| 2006/0056708 A1 | 3/2006 | Shen et al. |
| 2007/0110160 A1 | 5/2007 | Wang et al. |
| 2007/0121728 A1 | 5/2007 | Wang et al. |
| 2007/0160151 A1 | 7/2007 | Bolton et al. |
| 2007/0201562 A1 | 8/2007 | Ganesh et al. |
| 2008/0285642 A1 | 11/2008 | Jahanghir et al. |
| 2008/0310511 A1 | 12/2008 | Suzuki |
| 2009/0016430 A1 | 1/2009 | Schmit |
| 2009/0168871 A1 * | 7/2009 | Lu ........................ H04N 19/139 375/240.11 |
| 2009/0219387 A1 * | 9/2009 | Marman .......... G08B 13/19652 348/143 |
| 2009/0244299 A1 | 10/2009 | Fukunishi |
| 2009/0245374 A1 | 10/2009 | Hsu et al. |
| 2010/0104010 A1 * | 4/2010 | Guo ...................... H04N 19/197 375/240.12 |
| 2010/0166079 A1 | 7/2010 | Goel |
| 2010/0208139 A1 * | 8/2010 | Hii ....................... H04N 1/00347 348/571 |
| 2010/0265261 A1 * | 10/2010 | Chandler ................. G09G 5/36 345/547 |
| 2011/0038419 A1 | 2/2011 | Han et al. |
| 2011/0103486 A1 | 5/2011 | Sato et al. |

(56) References Cited

U.S. PATENT DOCUMENTS

| | | | |
|---|---|---|---|
| 2011/0194784 A1 | 8/2011 | Laroche et al. | |
| 2011/0206125 A1 | 8/2011 | Chien et al. | |
| 2011/0243234 A1* | 10/2011 | Kondo | H04N 19/61 375/240.16 |
| 2011/0255589 A1 | 10/2011 | Saunders et al. | |
| 2012/0008686 A1 | 1/2012 | Haskell | |
| 2012/0051431 A1 | 3/2012 | Chien et al. | |
| 2012/0069906 A1* | 3/2012 | Sato | H04N 19/523 375/240.17 |
| 2012/0093226 A1 | 4/2012 | Chien et al. | |
| 2012/0147967 A1 | 6/2012 | Panchal et al. | |
| 2012/0219054 A1 | 8/2012 | Daub et al. | |
| 2012/0257679 A1 | 10/2012 | Bankoski et al. | |
| 2012/0320978 A1 | 12/2012 | Ameres et al. | |
| 2013/0003849 A1 | 1/2013 | Chien et al. | |
| 2013/0022104 A1 | 1/2013 | Chen et al. | |
| 2013/0057646 A1 | 3/2013 | Chen et al. | |
| 2013/0085750 A1* | 4/2013 | Ozawa | H04N 21/234309 704/201 |
| 2013/0115928 A1* | 5/2013 | Kies | G06F 11/3414 455/414.1 |
| 2013/0229485 A1 | 9/2013 | Rusanovskyy et al. | |
| 2013/0322539 A1 | 12/2013 | Li | |
| 2013/0335522 A1* | 12/2013 | Zhang | H04N 19/597 348/43 |
| 2014/0010310 A1 | 1/2014 | Rapaka et al. | |
| 2015/0195525 A1 | 7/2015 | Sullivan et al. | |
| 2015/0195527 A1 | 7/2015 | Zhou et al. | |

FOREIGN PATENT DOCUMENTS

| | | |
|---|---|---|
| EP | 0884912 | 12/1998 |
| GB | 2343579 | 5/2000 |
| JP | 3129986 | 6/1991 |
| JP | 2006157531 | 6/2006 |
| WO | WO-0033581 | 6/2000 |
| WO | WO-03026296 | 3/2003 |
| WO | 2011046587 A1 | 4/2011 |
| WO | WO-2013002716 | 1/2013 |

OTHER PUBLICATIONS

"International Search Report and Written Opinion", Application No. PCT/US2014/071332, dated Jun. 30, 2015, 17 pages.

Ma,"Progressive Motion Vector Resolution for HEVC", Conference: Visual Communications and Image Processing (VCIP), 2013, 6 pages.

"International Preliminary Report on Patentability Issued in PCT Application No. PCT/US2014/071331", dated Mar. 21, 2016, 7 Pages.

"International Search Report and Written Opinion Issued in PCT Application No. PCT/US2015/010391", dated Mar. 16, 2016. 20 pages.

Chien, Wei-Jung, et al. "CE12: Adaptive Motion Vector Resolution from Qualcomm" Jan. 2011, 4 pages.

Sjoberg, Rickard, et al. "Overview of HEVC High-Level Syntax and Reference Picture Management", IEEE Transactions on Circuits and Systems for Video Technology, vol. 22, No. 12, Dec. 2012, 13 pages.

Davis,"Equivalence of Subpixel Motion Estimators Based on Optical Flow and Block Matching", Proc. IEEE International Symposium on Computer Vision, Nov. 1995, 7 Pages.

Girod,"Motion Compensation: Visual Aspects, Accuracy, and Fundamental Limits", Motion Analysis and Image Sequence Processing, Kluwer Academic Publishers, 1993, pp. 125-152.

Girod,"Motion-Compensating Prediction with Fractional-Pel Accuracy", IEEE Transactions on Comm., vol. 41, No. 4., Apr. 1993, pp. 604-612.

Guo,"Adaptive Motion Vector Resolution with Implicit Signaling", Retrieved From: IEEE International Conference on Image Processing, Sep. 2010, pp. 2057-2060.

Kossentini,"Predictive RD Optimized Motion Estimation for Very Low Bitrate Video Coding", Retrieved From: IEEE J. on Selected Areas in Communications, vol. 15, No. 9., Dec. 1997, 29 pages.

Lopes,"Analysis of Spatial Transform Motion Estimation with Overlapped Compensation and Fractional-pixel Accuracy", Retrieved From: IEEE Proc. Visual Image Signal Processing, vol. 146, No. 6., Dec. 1999, pp. 339-344.

Ribas-Corbera,"On the Optimal Motion Vector Accuracy for Block-based Motion-Compensated Video Coders", Retrieved From: Proc. SPIE Digital Video Compression, San Jose, CA, Mar. 1996, 15 Pages.

Wang,"Motion Estimation and Mode Decision for Low-Complexity H.264 Decoder", Retrieved From: IEEE International Conference on Acoustics, Speech, and Signal Processing, Apr. 2005, 25 Pages.

"International Search Report and Written Opinion", Application No. PCT/US2014/071331, Mar. 5, 2015, 12 Pages.

Sullivan,"Standardized Extensions of High Efficiency Video Coding (HEVC)", IEEE Journal of Selected Topics in Signal Processing, vol. 7, No. 6, Dec. 1, 2013, 16 Pages.

Zhou,"Motion Vector Resolution Control for Screen Content Coding", Joint Collaborative Team on Video Coding (JCT-VC) of ITU-T SG 16 WP 3 and ISO/IEC JTC 1/SC 29/WG 11 16th Meeting: San Jose, US Jan. 9-17, 2014, Jan. 9, 2014, 5 Pages.

Richardson, "Prediction of Inter Macroblocks in P-Slices", In Proceedings of Inter Prediction, H.264 / MPEG-4 Part 10 White Paper, Apr. 30, 2003, 3 Pages.

Sullivan, "Overview of the High Efficiency Video Coding (HEVC) Standard", Proceedings: In IEEE Transactions on Circuits and Systems for Video Technology, vol. 22, Issue 12, Dec. 2012, pp. 1649-1668.

Wiegand, et al., "Overview of the H.264/AVC Video Coding Standard", IEEE Transactions on Circuits and Systems for Video Technology, 13(7), Jul. 2003, pp. 560-576.

Yang, et al.,' "Prediction-Based Directional Fractional Pixel Motion Estimation for H.264 Video Coding", Proceedings: In IEEE International Conference on Acoustics, Speech, and Signal Processing, 2005, pp. II-901-II-904.

"Information Technology—Coding of Audio-Visual Objects: Visual", ISO/IEC JTC1/SC29/WG11 N2202 ISO/IEC JTC1/SC29/WG11 N2202, Mar. 1998, 331 pages.

"International Search Report and Written Opinion", Application No. PCT/US2014/071332, dated Apr. 21, 2016, 13 pages.

"Invitation to Pay Additional Fees/Partial International Search Report", Application No. PCT/US2015/010391, dated Jul. 5, 2016, 5 pages.

"ITU-T Recommendation H.261, Video Codec for Audiovisual Services at p × 64 kbits", Mar. 1993, 29 pages.

ITU-T Recommendation H.262, "Generic Coding of Moving Pictures and Associated Audio Information: Video", Jul. 1995, 211 pages.

ITU-T Recommendation H.264, "Advanced video coding for generic audiovisual services", Jan. 2012, 680 pages.

ITU-T Recommendation H.265, "High efficiency video coding", Apr. 2013, 317 pages.

"Microsoft Debuts New Windows Media Player 9 Series, Redefining Digital Media on the PC", Retrieved at: http://news.microsoft.com/2002/09/03/microsoft-debuts-new-windows-media-player-9-series-redefining-digital-media-on-the-pc/#sm.
0000ydczlqlisdsrv3y2qcbsyez68, Sep. 3, 2002, 4 pages.

"Non-Final Office Action", U.S. Appl. No. 14/513,132, dated Jul. 5, 2016, 16 pages.

"Non-Final Office Action", U.S. Appl. No. 14/530,625, dated Jun. 17, 2016, 47 pages.

"Overview of MPEG-2 Test Model 5", Retrieved at: http://www.mpeg.org/MPEG/MSSG/tm5/Overview.html—dated Jul. 19, 2016, 4 pages.

"Second Written Opinion", Application No. PCT/US2014/071332, dated Feb. 4, 2016, 5 pages.

"The TML Project WEB-Page and Archive", Retrieved at: https://web.archive.org/web/20050205054738/http://www.stewe.org/vceg.org/archive.htm—dated Jul. 27, 2016, Feb. 5, 2005, 3 pages.

(56) References Cited

OTHER PUBLICATIONS

"VC-1 Compressed Video Bitstream Format and Decoding Process", SMPTE Standard—SMPTE 421M-2006, Feb. 2006, 493 pages.
"Video coding for low bit rate communication", ITU-T Recommendation H.263, Feb. 1998, 167 pages.
"Video Coding Using Wavelet Decomposition for Very Low Bit-rate Networks", 1997, 16 pages.
An,"Progressive MV Resolution", Joint Collaborative Team on Video Coding (JCT-VC) of ITU-T SG16 WP3 and ISO/IEC JTC1/SC29/WG11, Jul. 2011.
An,"Progressive MV Resolution", oint Collaborative Team on Video Coding (JCT-VC)—JCTVC-F125, Jul. 2011, 15 pages.
Bankoski,"VP8 Data Format and Decoding Guide", Independent Submission, Request for Comments: 6386, Category: Informational, Nov. 2011, 304 pages.
Bartkowiak,"Color Video Compression Based on Chrominance Vector Quantization", 7th International Workshop on Systems, Signals and Image Processing, 2000, 4 pages.
Benzler,"Improving Multiresolution Motion Compensating Hybrid Coding by Drift Reduction", Picture Coding Symposium, Dec. 1997, 4 pages.
Borman,"Block-Matching Sub-Pixel Motion Estimation from Noisy, Under-Sampled Frames—An Empirical Performance Evaluation", SPIE Visual Communications and Image Processing, Jan. 27, 1999, 10 pages.
Conklin,"Multi-Resolution Motion Estimation", Proc. ICASSP '97,Munich, Germany,, 1997, 4 pages.
Ericcson,"Fixed and Adaptive Predictors for Hybrid Predictive/Transform Coding", IEEE Transactions on Communications, vol. COM-33, No. 12,, Dec. 1985, pp. 1291-1302.
Flierl,"Multihypothesis Motion Estimation for Video Coding", Mar. 2001, 10 pages.
Girod,"Efficiency Analysis of Multihypothesis Motion-Compensated Prediction for Video Coding", IEEE Transactions on Image Processing, vol. 9, No. 2, Feb. 2000, pp. 173-183.
Haan,"Sub-pixel Motion Estimation with 3-D Recursive Search Block-matching", Signal Processing: Image Communication 6, 1994, 11 pages.
Keys,"Cubic Convolution Interpolation for Digital Image Processing", IEEE Transactions on Acoustics, Speech, and Signal Processing, vol. ASSP-29, No. 6, Dec. 1981, pp. 1153-1160.
Konrad,"On Motion Modeling and Estimation for Very Low Bit Rate Video Coding", Visual Communications and Image Processing VCIP '95, May 1995, 12 pages.
Laroche,"Non-RCE1: On MV resolution and motion vector predictor number", oint Collaborative Team on Video Coding (JCT-VC)—JCTVC-Q0067, Mar. 2014, 5 pages.
Lee,"Techniques and Tools for Video Encoding and Decoding", U.S. Appl. No. 60/341,674, filed Dec. 17, 2001, 109 pages.
Li,"Adaptive MV precision for Screen Content Coding", Joint Collaborative Team on Video Coding (JCT-VC)—JCTVC-P0283, Jan. 2014, 3 pages.
Mook,"Next-Gen Windows Media Player Leaks to the Web", Retrieved at: http://betanews.com/2002/07/19/next-gen-windows-media-player-leaks-to-the-web/, Jul. 19, 2002, 4 pages.
Morimoto,"Fast Electronic Digital Image Stabilization", Proc. !CPR, Vienna, Austria, Aug. 1996, 5 pages.
Ohm,"Comparison of the Coding Efficiency of Video Coding Standards Including High Efficiency Video Coding (HEVC)", IEEE Transactions on Circuits and Systems for Video Technology, vol. 22, No. 12, Dec. 1, 2012, pp. 1669-1684.
Ribas-corbera,"On the Optimal Block Size for Block-Based, Motion-Compensated Video Coders", SPIE Proc. of Visual Communications and Image Processing, vol. 3024,, Feb. 1997, 12 pages.
Rosewarne,"BoG report on Range Extensions", Joint Collaborative Team on Video Coding (JCT-VC)—Document: JCTVC-P0288, Jan. 2014, 16 pages.

Schultz,"Subpixel Motion Estimation for Super-Resolution Image Sequence Enhancement", Journal of Visual Communication and Image Representation, vol. 9(1), 1998, pp. 38-50.
Srinivasan,"Video Encoding and Decoding Tools and Techniques", U.S. Appl. No. 60/488,710, filed Jul. 18, 2003, 225 pages.
Su,"Global Motion Estimation From Coarsely Sampled Motion Vector Field and the Applications", IEEE Transactions on Circuits and Systems for Video Technology, vol. 15, No. 2, Feb. 2005, 12 pages.
Sullivan,"The H.264/AVC Advanced Video Coding Standard: Overview and Introduction to the Fidelity Range Extensions", Presented at the SPIE Conference on Applications of Digital Image Processing XXVII, Aug. 2004, 21 pages.
Triggs,"Empirical Filter Estimation for Subpixel Interpolation and Matching", Int'l Conference on Computer Vision '01, Vancouver, Canada, Jul. 2001, 9 pages.
Triggs,"Optimal Filters for Subpixel Interpolation and Matching", Int'l Conf Computer Vision 2001, Jul. 2001, 10 pages.
Wedi,"Complexity Reduced Motion Compensated Prediction with 1/8-pel Displacement Vector Resolution", Dec. 29, 2000, 7 pages.
Wedi,"Motion- and Aliasing-Compensated Prediction for Hybrid Coding", IEEE Transactions on Circuits and Systems for Video Technology, vol. 13, No. 7, Jul. 2003, 10 pages.
Weigand,"Joint Model No. 1, Revision 1(JM-1r1)", Dec. 2001, 80 pages.
Wein,"Variable Block-Size Transforms for Hybrid Video Coding", Dissertation, Feb. 2004, Feb. 2004, 184 pages.
Zhou,"Motion Vector Resolution Control for Screen Content Coding", oint Collaborative Team on Video Coding (JCT-VC) of ITU-T SG 16 WP 3 and ISO/IEC JTC 1/SC 29/WG 11, Jan. 2014, 5 pages.
Zhou,"RCE1: Subtest 1—Motion Vector Resolution Control", Joint Collaborative Team on Video Coding (JCT-VC) of ITU-T SG 16 WP 3 and ISO/IEC JTC 1/SC 29/WG 11, Mar. 2014, 5 pages.
"International Preliminary Report on Patentability", Application No. PCT/US2015/010391, dated Oct. 4, 2016, 13 pages.
"Foreign Office Action", RU Application No. 2016127286, dated Aug. 30, 2016, 3 pages.
"Second Written Opinion", Application No. PCT/US2015/010391, dated Aug. 25, 2016, 4 pages.
"Final Office Action", U.S. Appl. No. 14/513,132, dated Dec. 15, 2016, 17 pages.
"Final Office Action", U.S. Appl. No. 14/530,625, dated Dec. 6, 2016, 73 pages.
Benzler et al., "Motion and Aliasing Compensating Prediction with Quarter-pel Accuracy and Adaptive Overlapping Blocks as Proposal for MPEG-4 Tool Evaluation—Technical Description," ISO/IEC JTC1/SC29/WG11, MPEG95/0552, 5 pp. document marked 1995.
Benzler, "Results of Core Experiment P8 (Motion an Aliasing Compensating Prediction)," ISO/IEC JTC1/SC29/WG11, MPEG97/2625, 8 pp., document marked 1997.
Bjontegaard,"H.26L Test Model Long Term No. 5 (TML-5) draft0," q15k59d1.doc, 35 pp. (document marked Oct. 2000).
Chen et al., "Description of Screen Content Coding Technology Proposal by NCTU and ITRI International," JCTVC-Q0032-r1, 26 pp. (Mar. 2014).
Communication Pursuant to Rules 161(1) and 162 EPC dated Jul. 13, 2016, from European Patent Application No. 14825548.2, 2 pp.
Communication Pursuant to Rules 161(1) and 162 EPC dated Jul. 16, 2016, from European Patent Application No. 15703132.9, 2 pp.
Corrected Notice of Allowability dated Aug. 2, 2017, from U.S. Appl. No. 14/530,625, 4 pp.
Ebrahimi, "MPEG-4 Video Verification Model Version 10.0," ISO/IEC JTC1/SC29/WG11, MPEG98/N1992, pp. 1, 43-52, 72-74, 123-130, and 190, document marked 1998.
Horn et al., "Estimation of Motion Vector Fields for Multiscale Motion Compensation," *Proceedings Picture Coding Symposium (PCS 97)*, pp. 141-144 (Sep. 1997).
International Preliminary Report on Patentability dated Apr. 21, 2016, from International Patent Application No. PCT/US2014/071332, 12 pp.
ITU—Q15-F-24, "MVC Video Codec—Proposal for H.26L," Study Group 16, Video Coding Experts Group (Question 15), 28 pp. (1998).

(56) References Cited

OTHER PUBLICATIONS

ISO/IEC 11172-2, "Information Technology—Coding of Moving Pictures and Associated Audio for Digital Storage Media at up to About 1,5 Mbit/s—Part 2: Video," 122 pp. (Aug. 1993).

ITU-T Recommendation H.263, "Video Coding for Low Bit Rate Communication," (Jan. 2005).

Iwahashi et al., "A Motion Compensation Technique for Downscaled Pictures in Layered Coding," *IEICE Transactions on Comm.*, vol. E77-B, No. 6, pp. 1007-1012 (Aug. 1994).

Joint Video Team (JVT) of ISO/IEC MPEG & ITU-T VCEG, "Joint Final Committee Draft (JFCD) of Joint Video Specification," JVT-D157, 218 pp. (Aug. 2002).

Notice of Allowance and Fee(s) Due dated May 18, 2006, from U.S. Appl. No. 10/379,606.

Notice of Allowance and Fee(s) Due dated Apr. 26, 2017, from U.S. Appl. No. 14/513,132.

Notice of Allowance and Fee(s) Due dated May 26, 2017, from U.S. Appl. No. 14/530,625, 20 pp.

Office Action dated Aug. 30, 2016, from Russian Patent Application No. 2016127312, 2 pp.

Office Action dated Aug. 2, 2016, from Russian Patent Application No. 2016127286, 2 pp.

Printouts of FTP directories from http://ftp3.itu.ch, 8 pp. (Downloaded from the World Wide Web on Sep. 20, 2005).

Reader, "History of MPEG Video Compression—Ver. 4.0," 99 pp., document marked Dec. 16, 2003.

Weiss et al., "Real Time Implementation of Subpixel Motion Estimation for Broadcast Applications," pp. 7/1-7/3 (1990).

Yang et al., "Very High Efficiency VLSI Chip-Pair for Full Search Block Matching with Fractional Precision," *Proc. ICASSP, IEEE Int'l Conf. on Accoustics, Speech and Signal Processing*, Glasgow, pp. 2437-2440 (May 1989).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

\* cited by examiner

ENCODING SCREEN CAPTURE DATA

RELATED APPLICATIONS

This application claims priority under 35 U.S.C. § 119(e) to U.S. Provisional Patent Application No. 61/925,090 entitled "Encoding Screen Capture Data" filed on Jan. 8, 2014, the disclosure of which is incorporated in its entirety by reference herein.

BACKGROUND

In modern communication systems a video signal may be sent from one terminal to another over a medium such as a wired and/or wireless network, often a packet-based network such as the Internet. For example the video may be part of a VoIP (voice over Internet Protocol) call conducted from a VoIP client application executed on a user terminal such as a desktop or laptop computer, tablet or smart phone.

Typically the frames of the video are encoded by an encoder at the transmitting terminal in order to compress them for transmission over the network. The encoding for a given frame may comprise intra frame encoding whereby blocks are encoded relative to other blocks in the same frame. In this case a target block is encoded in terms of a difference (the residual) between that block and a neighbouring block. Alternatively the encoding for some frames may comprise inter frame encoding whereby blocks in the target frame are encoded relative to corresponding portions in a preceding frame, typically based on motion prediction. In this case a target block is encoded in terms of a motion vector identifying an offset between the block and the corresponding portion from which it is to be predicted, and a difference (the residual) between the block and the corresponding portion from which it is predicted. A corresponding decoder at the receiver decodes the frames of the received video signal based on the appropriate type of prediction, in order to decompress them for output to a screen at the decoder side.

When encoding (compressing) a video, the motion vectors are used to generate the inter frame prediction for the current frame. The encoder first searches for a similar block (the reference block) in a previous encoded frame that best matches the current block (target block), and signals the displacement between the reference block and target block to the decoder as part of the encoded bitstream. The displacement is typically represented as horizontal and vertical x and y coordinates, and is referred to as the motion vector.

The reference "block" is not in fact constrained to being at an actual block position in the reference frame, i.e. is not restricted to the same grid as the target blocks, but rather it is a correspondingly-sized portion of the reference frame offset relative to the target block's position by the motion vector. According to present standards the motion vectors are represented at fractional pixel resolution. For instance in the H.264 standard each motion vector is represented at ¼ pixel resolution. So by way of example, if a 16×16 block in the current frame is to be predicted from another 16×16 block in the previous frame that is at 1 pixel left of the position of the target block, then the motion vector is (4,0). Or if the target block is to be predicted from a reference block that is only, say, ¾ of a pixel to the left of the target block, the motion vector is (3,0). The reference block at a fractional pixel position does not actually exist per se, but rather it is generated by interpolation between pixels of the reference frame. The sub-pixel motion vectors can achieve significant performance in terms of compression efficiency.

SUMMARY

However, using a fractional pixel resolution incurs more bits to encode the motion vector than if motion was estimated at integer pixel resolution, and it also incurs more processing resources in searching for the best matching reference. For video coding this may be worthwhile, e.g. as the reduced size of a better-matched residual may generally outweigh the bits incurred encoding the motion vector, or the quality achieved may be considered to justify the resources. However, not all moving images to be encoded are videos (i.e. captured from a camera). The following is based on an observation recognised herein, that when encoding (compressing) a moving image that is captured from a screen rather than a camera, most of the motion vectors in the encoded bit stream will generally point to integer pixels, while very few of them tend to be found at fractional pixel positions. Thus while encoders normally represent motion vectors in bit streams in units of ¼ pixels, for screen sharing or recording applications bandwidth can in fact be saved without undue loss of quality by encoding the motion vectors in units of only 1 pixel. Alternatively, even if the motion vectors are still represented in the encoded bitstream on a scale of fractional pixels, processing resources may be saved by restricting the motion vector search to integer pixel offsets.

Hence according to one aspect disclosed herein, there is provided an encoder comprising an input for receiving moving image data, and a motion prediction module for use in encoding the moving image data. The moving image data comprises a sequence of frames to be encoded, and each frame is divided into a plurality of blocks in two dimensions, with each block comprising a plurality of pixels in said two dimensions. The blocks may for example be the divisions referred to as blocks or macroblocks in an H.26x standard like H.264 or H.265. The motion prediction module performs inter frame encoding by coding each block (the target block) relative to a respective reference portion of another frame of the sequence (the reference "block"), with the respective reference being offset from the target block by a respective motion vector. Further, in accordance with the present disclosure, the moving image data of said plurality of frames comprises a screen capture stream, and the motion prediction module is configured to restrict each of the motion vectors of the screen capture stream to an integer number of pixels in at least one of said dimensions.

In embodiments, considering that the factional motion vector can still be useful for normal video (captured by camera) or perhaps other moving images (e.g. animations), the motion vector may be signalled in a flexible way: when the video source is from a captured screen the motion vector may be signalled in units of 1 pixel, but for normal video and/or other moving images a fractional pixel unit may still be used.

Hence in embodiments, the encoder may also comprise a controller which is operable to switch the motion prediction module between two modes: a first mode and a second mode. In the first mode the motion vector is not restricted to an integer number of pixels (in either dimension), but in the second mode the motion vector is restricted to an integer number of pixels in at least one dimension (and in embodiments both). The controller may be configured to switch the motion prediction module to the second mode in dependence on determining that the moving image data currently being encoded comprises a screen capture stream.

For instance, the moving image data may comprise the screen capture stream and a video stream (e.g. these could be live streams of a call conducted over packet-based network such as the Internet, or could be stored streams intended for later playback). It could be that some frames of the moving image data are frames of the screen capture stream and at other times the frames of the moving image data are video frames, or it could be that different regions within each frame comprise the screen capture and video streams respectively (e.g. different slices). To accommodate such cases, the controller may be configured to determine whether the moving image data currently being encoded is the screen capture stream or the video stream, and to set the motion prediction module to the second mode for screen capture and the first mode for video. Alternatively, as another example, if a screen capture stream and video stream are included in different regions of some of the same frames, the controller may be configured to select the second mode if a frame contains any screen capture data at all, and otherwise to select the first mode only if the frame contains no screen capture data; or conversely it may be configured to switch to the second mode if a frame contains only screen capture data and no video, and otherwise to select the first mode if the frame contains any video at all.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF PREFERRED EMBODIMENTS

Figure 1:
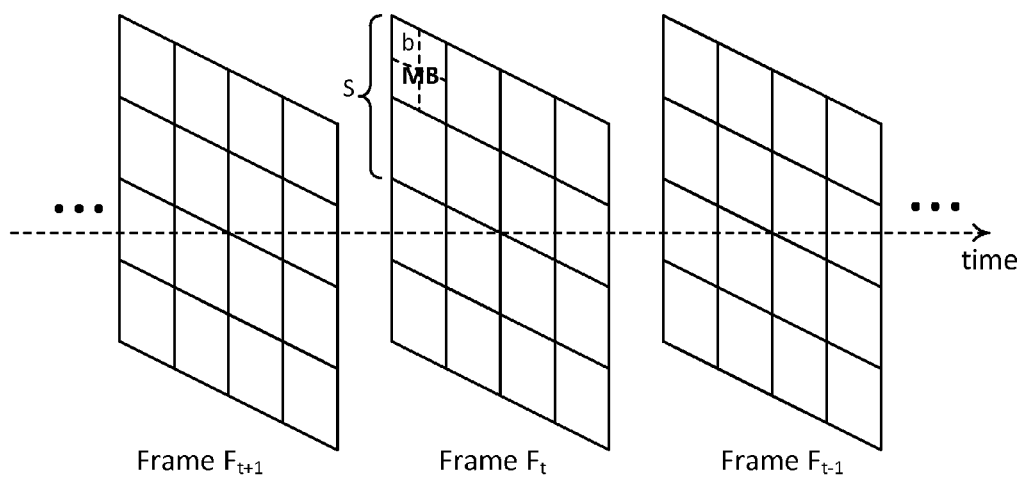
FIG. 1 is a schematic representation of a video stream.

FIG. 1 gives a schematic illustration of an input video signal captured from a camera, and divided into spatial divisions to be encoded by a video encoder so as to generate an encoded bitstream. The signal comprises a moving video image divided in time into a plurality of frames (F), each frame representing the image at a different respective moment in time ( . . . t−1, t, t+1 . . . ). Within each frame, the frame is divided in space into a plurality of divisions each representing a plurality of pixels. These divisions may be referred to as blocks. In certain schemes, the frame is divided and sub-divided into different levels of block. For example each frame may be divided into macroblocks (MB) and each macroblock may be divided into blocks (b), e.g. each block representing a region of 8×8 pixels within a frame and each macroblock representing a region of 2×2 blocks (16×16 pixels). In certain schemes each frame can also be divided into independently decodable slices (S), each comprising a plurality of macroblocks. The slices S can generally take any shape, e.g. each slice being one or more rows of macroblocks or an irregular or arbitrarily defined selection of macroblocks (e.g. corresponding to a region of interest, ROI, in the image).

With regard to the term "pixel", in the following the term is used to refer to samples and sampling positions in the sampling grid for the picture array (sometimes in the literature the term "pixel" is instead used to refer to all three colour components corresponding to one single spatial position, and sometimes it is used to refer to a single position or a single integer sample value in a single array). The resolution of the sampling grid is often different between the luma and chroma sampling arrays. In embodiments the following may be applied to a 4:4:4 representation, but it may potentially also be applied in 4:2:2 and 4:2:0 for example.

Note also that while any given standard may give specific meanings to the terms block or macroblock, the term block is also often used more generally in the art to refer to a division of the frame at a level on which encoding and decoding operations like intra or inter prediction are performed, and it is this more general meaning that will be used herein unless specifically stated otherwise. For example the blocks referred to herein may in fact be the divisions called blocks or macroblocks in the H.26x standards, and the various encoding and decoding stages may operate at a level of any such divisions as appropriate to the encoding mode, application and/or standard in question.

A block in the input signal as captured is usually represented in the spatial domain, where each colour-space channel is represented as a function of spatial position within the block. For example in YUV colour space each of the luminance (Y) and chrominance (U,V) channels may be represented as a function of Cartesian coordinates x and y, Y(x,y), U(x,y) and V(x,y); or in RGB colour space each of the red (R), green (G) and blue (B) channels may be represented as a function of Cartesian coordinates R(x,y), G(x,y), B(x,y). In this representation, each block or portion is represented by a set of pixel values at different spatial coordinates, e.g. x and y coordinates, so that each channel of the colour space is represented in terms of a respective magnitude of that channel at each of a discrete set of pixel locations.

Prior to quantization however, the block may be transformed into a transform domain representation as part of the encoding process, typically a spatial frequency domain representation (sometimes just referred to as the frequency domain). In the frequency domain each colour-space channel in the block is represented as a function of spatial frequency (dimensions of 1/length) in each of two dimensions. For example this could be denoted by wavenumbers $k_x$ and $k_y$ in the horizontal and vertical directions respectively, so that the channels may be expressed as $Y(k_x, k_y)$, $U(k_x, k_y)$ and $V(k_x, k_y)$ in YUV space; or $R(k_x, k_y)$, $G(k_x,k_y)$, $B(k_x,k_y)$ in RGB space. Thus instead of representing a colour-space channel in terms of a magnitude at each of a discrete set of pixel positions, the transform represents each colour-space channel in terms of a coefficient associated with each of a discrete set of spatial frequency components which make up the block, i.e. an amplitude of each of a discrete set of spatial frequency terms corresponding to different frequencies of spatial variation across the block. Possibilities for such transforms include a Fourier transform, Discrete Cosine Transform (DCT), Karhunen-Loeve Transform (KLT), or others.

Figure 2:
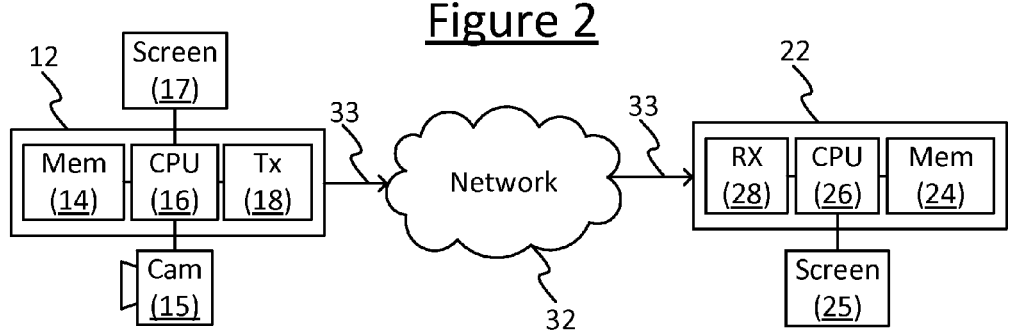
FIG. 2 is a schematic block diagram of a communication system.

The block diagram of FIG. 2 gives an example of a communication system in which the techniques of this disclosure may be employed. The communication system comprises a first, transmitting terminal 12 and a second, receiving terminal 22. For example, each terminal 12, 22 may comprise one of a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a computer-readable storage medium 14 such as a flash memory or other electronic memory, a magnetic storage device, and/or an optical storage device. The first terminal 12 also comprises a processing apparatus 16 in the form of a processor or CPU having one or more execution units, a transceiver such as a wired or wireless modem having a transmitter 18, a video camera 15 and a screen 17 (i.e. a display or monitor). Each of the camera 15 and screen 17 may or may not be housed within the same casing as the rest of the terminal 12 (and even the transmitter 18 could be internal or external, e.g. comprising a dongle or wireless router in the latter case). The storage medium 14, video camera 15, screen 17 and transmitter 18 are each operatively coupled to the processing apparatus 16, and the transmitter 18 is operatively coupled to the network 32 via a wired or wireless link. Similarly, the second terminal 22 comprises a computer-readable storage medium 24 such as an electronic, magnetic, and/or an optical storage device; and a processing apparatus 26 in the form of a CPU having one or more execution units. The second terminal comprises a transceiver such as a wired or wireless modem having at least a receiver 28 and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage 14 on the first terminal 12 stores at least an encoder for encoding moving image data, the encoder being arranged to be executed on the respective processing apparatus 16. When executed the encoder receives a "raw" (unencoded) input video stream from the video camera 15, it is operable to encode the video stream so as to compress it into a lower bitrate stream, and outputs the encoded video stream for transmission via the transmitter 18 and communication network 32 to the receiver 28 of the second terminal 22. The storage 24 on the second terminal 22 stores at least a video decoder arranged to be executed on its own processing apparatus 26. When executed the decoder receives the encoded video stream from the receiver 28 and decodes it for output to the screen 25.

The encoder and decoder are also operable to encode and decode other types of moving image data, including screen sharing streams. A screen sharing stream is image data captured from a screen 17 at the encoder side so that one or more other, remote users can see what the user at the encoder side is seeing on screen, or so the user of that screen can record what's happening on screen for playback to one or more other users later. In the case of a call conducted between a transmitting terminal 12 and receiving terminal 22, the moving content of the screen 17 at the transmitting terminal 12 will be encoded and transmitted live (in real-time) to be decoded and displayed on the screen 25 of the receiving terminal 22. For example the encoder-side user may wish to share with another user how her or she is working the desktop of his or her operating system, or some application.

Note that where it is said that a screen sharing stream is captured from a screen, or the like, this does not limit to any particular mechanism for doing so. E.g. the data could be read from a screen buffer of the screen 17, or captured by receiving an instance of the same graphical data that is being output from the operating system or an application for display on the screen 17.

Figure 3:
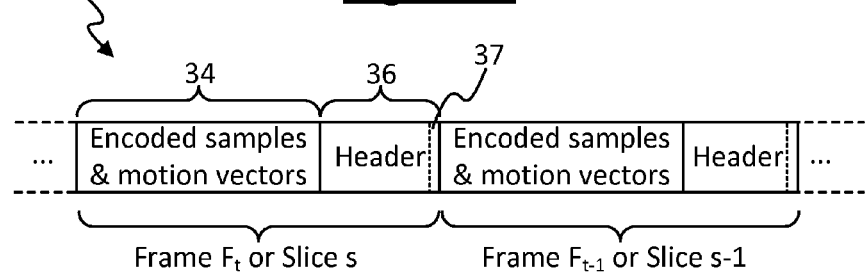
FIG. 3 is a schematic representation of an encoded video stream.

FIG. 3 gives a schematic representation of an encoded bitstream 33 as would be transmitted from the encoder running on the transmitting terminal 12 to the decoder running on the receiving terminal 22. The bitstream 33 comprises encoded image data 34 for each frame or slice comprising the encoded samples for the blocks of that frame or slice along with any associated motion vectors. In one application, the bitstream may be transmitted as part of a live (real-time) call such as a VoIP call between the transmitting and receiving terminals 12, 22 (VoIP calls can also include video and screen sharing). The bitstream 33 also comprises header information 36 associated with each fame or slice. In embodiments the header 36 is arranged to include at least one additional element in the form of at least one flag 37 indicating the resolution of the motion vector, which will be discussed in more detail below.

Figure 4:
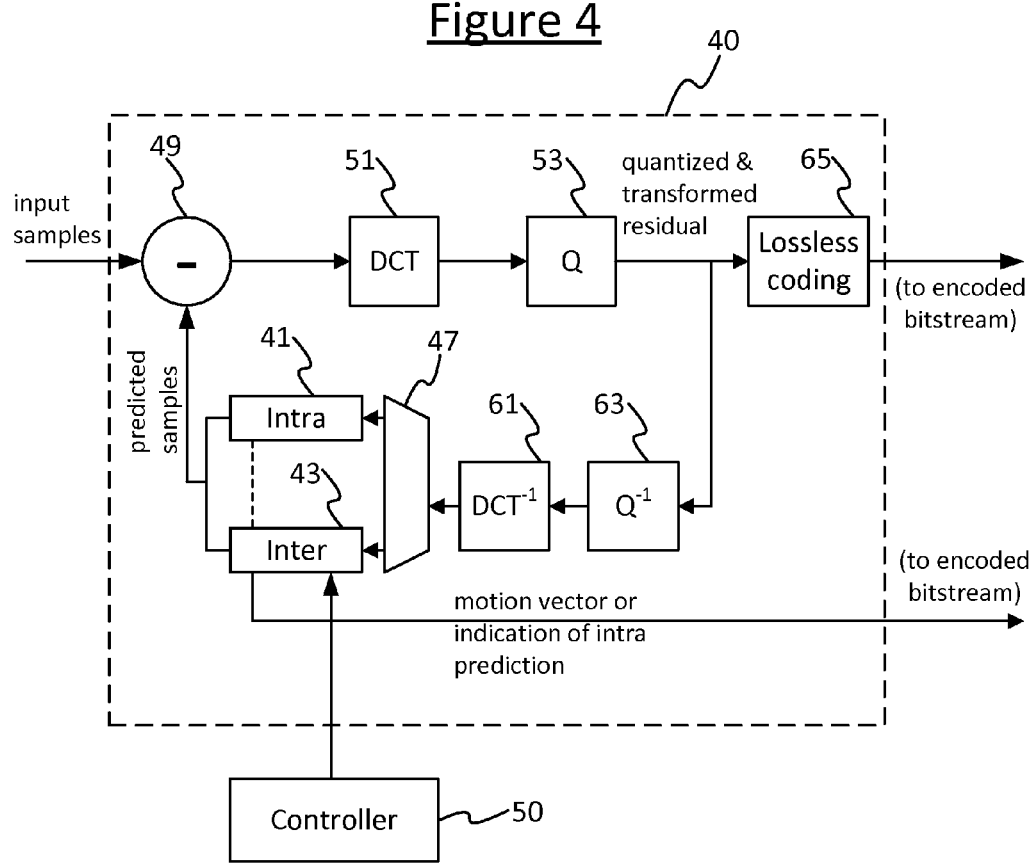
FIG. 4 is a schematic block diagram of an encoder.

FIG. 4 is a block diagram illustrating an encoder such as might be implemented on transmitting terminal 12. The encoder comprises a main encoding module 40 comprising: a discrete cosine transform (DCT) module 51, a quantizer 53, an inverse transform module 61, an inverse quantizer 63, an intra prediction module 41, an inter prediction module 43, a switch 47, a subtraction stage (−) 49, and a lossless decoding stage 65. The encoder further comprises a control module 50 coupled to the inter prediction module 43. Each of these modules or stages may be implemented as a portion of code stored on the transmitting terminal's storage medium 14 and arranged for execution on its processing apparatus 16, though the possibility of some or all of these being wholly or partially implemented in dedicated hardware circuitry is not excluded.

The subtraction stage 49 is arranged to receive an instance of the input signal comprising a plurality of blocks over a plurality of frames (F). The input stream is received from a camera 15 or captured from what is being displayed on the screen 17. The intra or inter prediction 41, 43 generates a predicted version of a current (target) block to be encoded based on a prediction from another, already-encoded block or correspondingly-sized reference portion. The predicted version is supplied to an input of the subtraction stage 49, where it is subtracted from the input signal (i.e. the actual signal) in the spatial domain to produce a residual signal representing a difference between the predicted version of the block and the corresponding block in the actual input signal.

In intra prediction mode, the intra prediction 41 module generates a predicted version of the current (target) block to be encoded based on a prediction from another, already-encoded block in the same frame, typically a neighbouring block. When performing intra frame encoding, the idea is to only encode and transmit a measure of how a portion of image data within a frame differs from another portion within that same frame. That portion can then be predicted at the decoder (given some absolute data to begin with), and so it is only necessary to transmit the difference between the prediction and the actual data rather than the actual data itself. The difference signal is typically smaller in magnitude, so takes fewer bits to encode (due to the operation of the lossless compression stage 65—see below).

In inter prediction mode, the inter prediction module 43 generates a predicted version of the current (target) block to be encoded based on a prediction from another, already-encoded reference portion in a different frame than the current block, the reference portion having the size of a block but being offset relative to the target block in the spatial domain by a motion vector that is predicted by the inter prediction module 43 (inter prediction may also be referred to as motion prediction or motion estimation). The inter-prediction module 43 selects the optimal reference for a given target block by searching, in the spatial domain, through a plurality of candidate reference portions offset by a plurality of respective possible motion vectors in one or more frames other than the target frame, and selecting the candidate that minimises the residual with respect to the target block according to a suitable metric. The inter prediction module 43 is switched into the feedback path by switch 47, in place of the intra frame prediction stage 41, and so a feedback loop is thus created between blocks of one frame and another in order to encode the inter frame relative to those of the other frame. I.e. the residual now represents the difference between the inter predicted block and the actual input block. This typically takes even fewer bits to encode than intra frame encoding.

The samples of the residual signal (comprising the residual blocks after the predictions are subtracted from the input signal) are output from the subtraction stage 49 through the transform (DCT) module 51 (or other suitable transformation) where their residual values are converted into the frequency domain, then to the quantizer 53 where the transformed values are converted to substantially discrete quantization indices. The quantized, transformed indices of the residual as generated by the transform and quantization modules 51, 53, as well as an indication of the prediction used in the prediction modules 41, 43 and any motion vectors generated by the inter prediction module 43, are all output for inclusion in the encoded video stream 33 (see element 34 in FIG. 3); via a further, lossless encoding stage 65 such as a Golomb encoder or entropy encoder where the motion vectors and transformed, quantized indices are further compressed using lossless encoding techniques known in the art.

An instance of the quantized, transformed signal is also fed back though the inverse quantizer 63 and inverse transform module 61 to generate a predicted version of the block (as would be seen at the decoder) for use by the selected prediction module 41 or 43 in predicting a subsequent block to be encoded, in the same way the current target block being encoded was predicted based on an inverse quantized and inverse transformed version of a previously encoded block. The switch 47 is arranged to pass the output of the inverse quantizer 63 to the input of either the intra prediction module 41 or inter prediction module 43 as appropriate to the encoding used for the frame or block currently being encoded.

Figure 5:
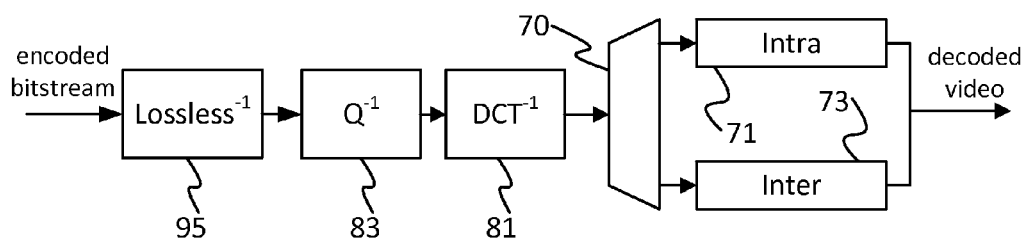
FIG. 5 is a schematic block diagram of a decoder.

FIG. 5 is a block diagram illustrating a decoder such as might be implemented on the receiving terminal 22. The decoder comprises an inverse of the lossless encoding 95, an inverse quantization stage 83, an inverse DCT transform stage 81, a switch 70, and an intra prediction stage 71 and a motion compensation stage 73. Each of these modules or stages may be implemented as a portion of code stored on the receiving terminal's storage medium 24 and arranged for execution on its processing apparatus 26, though the possibility of some or all of these being wholly or partially implemented in dedicated hardware circuitry is not excluded.

The inverse quantizer 81 is arranged to receive the encoded signal 33 from the encoder, via the receiver 28 and inverse lossless coding stage 95. The inverse quantizer 81 converts the quantization indices in the encoded signal into de-quantized samples of the residual signal (comprising the residual blocks) and passes the de-quantized samples to the reverse DCT module 81 where they are transformed back from the frequency domain to the spatial domain. The switch 70 then passes the de-quantized, spatial domain residual samples to the intra or inter prediction module 71 or 73 as appropriate to the prediction mode used for the current frame or block being decoded, and the intra or inter prediction module 71, 73 uses intra or inter prediction respectively to decode the blocks. Which mode to use is determined using the indication of the prediction and/or any motion vectors received with the encoded samples 34 in the encoded bitstream 33. Following on from this stage, the decoded blocks are output to be played out through the screen 25 at the receiving terminal 22.

Figure 6:
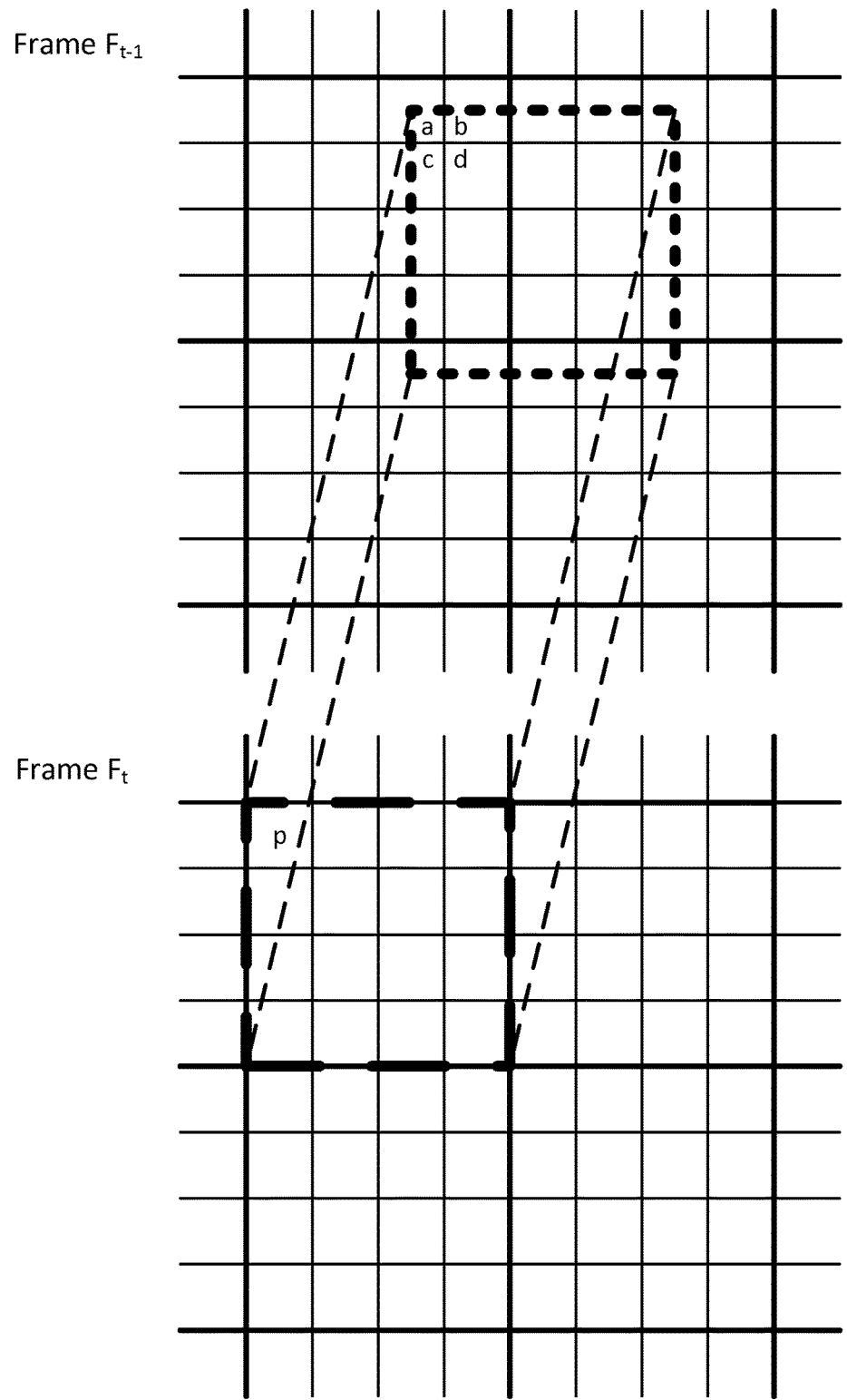
FIG. 6 is a schematic representation of inter frame encoding scheme.

As mentioned, codecs according to conventional standards perform motion prediction at a resolution of quarter pixels, meaning the motion vectors are also expressed in terms of quarter pixel steps. An example of quarter pixel resolution motion estimation is shown in FIG. 6. In this example, pixel p in the upper left corner of the target block is predicted from an interpolation between the pixels a, b, c and d, and the other pixels of the target block will also be predicted based on a similar interpolation between respective groups of pixels in the reference frame, according to the offset between the target block in one frame and the reference portion in the other frame (these blocks being shown with bold dotted lines in FIG. 6). However, performing motion estimation with this granularity has consequences, as discussed below.

Referring to the lossless coder 65 and decoder 95, lossless coding is a form of compression which works not by throwing away information (like quantisation), but by using different lengths of codeword to represent different values depending on how likely those values are to occur, or how frequently they occur, in the data to be encoded by the lossless encoding stage 65. For example the number of leading 0s in the codeword before encountering a 1 may indicate the length of the codeword, so 1 is the shortest codeword, then 010 and 011 are the next shortest, then 00100 . . . , and so forth. Thus the shortest codewords are much shorter than would be required if a uniform codeword length was used, but the longest are longer than that. But by allocating the most frequent or likely values to the shortest codewords and only the least likely or frequently occurring values to the longer codewords, the resulting bitstream 33 can on average incur fewer bits per encoded value than if a uniform codeword length was used, and thus achieve compression without discarding any further information.

Much of the encoder 40 prior to the lossless encoding stage 65 is designed to try to make as many of the values as small as possible before being passed through the lossless coding stage 65. As they then occur more often, smaller values will then incur lower bitrate in the encoded bitstream 33 than larger values. This is why the residual is encoded as opposed to absolute samples. It is also the rationale behind the transform 51, as many samples tend to transform to zero or small coefficients in the transform domain.

A similar consideration can be applied to the encoding of the motion vectors.

For instance, in H.264/MPEG-4 Part 10 and H.265/HEVC the motion vector is encoded with Exponential Golomb Coding. The following table shows the motion vector values and the encoded bits.

| Value | Codeword | Number of Bits Incurred |
|---|---|---|
| 0 | 1 | 1 |
| 1 | 010 | 3 |
| 2 | 011 | 3 |
| 3 | 00100 | 5 |
| 4 | 00111 | 5 |
| 5 | 0001000 | 7 |
| ... | | |

From the table above it can be seen that the larger the value is, the more bits are used. This means the higher the resolution of the motion vector, the more bits are incurred. E.g. so with a quarter pixel resolution, an offset of 1 pixel has to be represented by a value of 4, incurring 5 bits in the encoded bitstream.

In encoding video (captured from a camera) the cost of this resolution in the motion vector may be worthwhile, as the finer resolution may provide more opportunities in the search for a lower cost residual reference. However, it is observed herein that for moving images captured from a screen, most of the spatial displacements tend to be at full pixel displacements and few of them tend to be at fractional pixel positions, so most of the motion vectors tend to point to integer pixel values and very few tend to point to fractional pixel values.

On such a basis, it may be desirable to encode the motion vectors for image data captured from a screen with a resolution of 1 pixel. Considering the fact that no bits need to be spent on the fractional parts of motion vectors for such content, this means the bit rate incurred in encoding such content can be reduced.

For example, while encoders normally interpret motion vectors in bitstreams in units of ¼ pixel offsets, an encoder may in fact often be able to save bit rate by abandoning this resolution and instead encoding the motion vectors for screen coding applications in units of integer pixel offsets. Although it will reduce the precision of the motion vectors by a factor of four, such precision is generally less worthwhile for screen sharing or recording applications and this also reduces the number of bits needed to code the vectors. To predict a current (target) block from a reference block 1 pixel left of the target block, the motion vector will be (1,0) instead of (4,0). Using the above Golomb encoding, this means the bits incurred for encoding the motion vector change from (00111, 1) to (010, 1) and so two bits are saved in this case.

Furthermore, in embodiments the reduced resolution motion vector may also reduce the complexity of the motion estimation performed at the encoder by restricting the motion vector search to integer values, thus reducing processing resources incurred by the search. Alternatively it would be possible to perform a normal search and round the resulting motion vectors to integer values.

Figure 7:
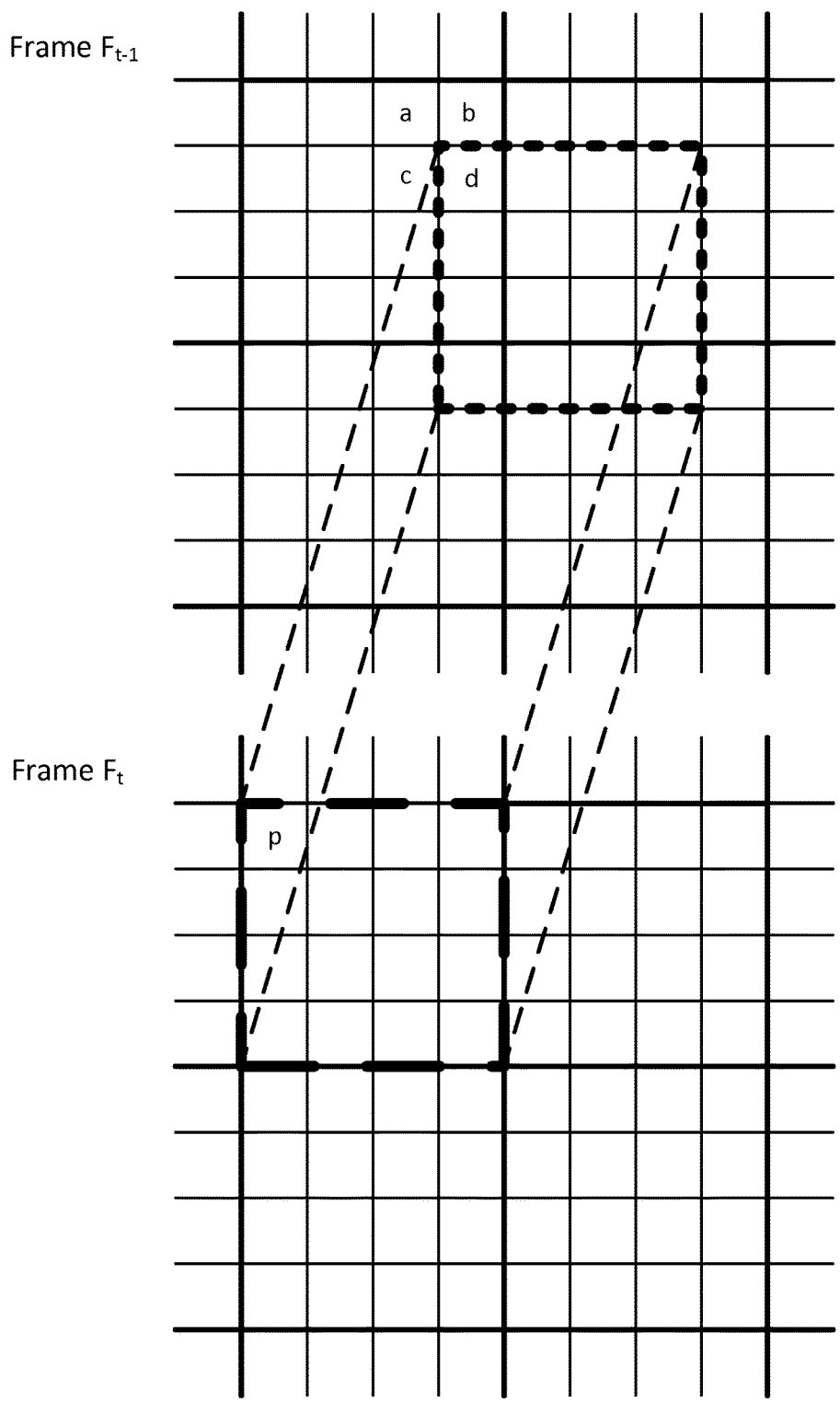
FIG. 7 is a schematic representation of another inter frame encoding scheme.

FIG. 7 shows an example of motion prediction constrained to a resolution of whole pixels only, with the motion vector being constrained to whole pixel steps only. In contrast with FIG. 6, the pixel p is predicted only from a single, whole pixel a with no interpolation. It could alternatively have been predicted from pixel b, c, d or another pixel depending on the offset between the target block in one frame and the reference portion in the other frame (shown again with bold dotted lines), but due to the constraint it could not have been predicted from an interpolation between pixels. Note: for any given block the quarter pixel prediction as illustrated by way of example in FIG. 6 could happen to have generated a whole pixel offset with no interpolation, if that gave the lowest residual. However, it would not have been constrained to doing so, and over a sizable image it would be highly unlikely that would have happened for all blocks.

Considering that fractional motion vector values can still be very useful for camera-captured content, in embodiments the encoder 40 is provided with a controller 50 coupled to the motion prediction module 43 with the controller 50 being configured to select the motion vector resolution in a flexible way: when the source data is from a captured screen 17 and there is no fractional pixel motion, the motion vector is encoded and transmitted in units of only whole pixels; but for camera-content video the motion vectors are still encoded and transmitted with fractional pixel precision.

In order to do this, the controller 50 may be configured to measure a performance heuristic indicative of the fact that the type of content being captured is screen content. In response, it then disables fractional pixel motion compensation for screen content coding. Alternatively, the controller 50 may receive an indication from an application or the operating system as to what type of data it is supplying to the encoder for encoding, and the controller 50 may select between the mode on that basis. As another option is may make the selection based on historical data. The selection may be made on a per-frame basis, or the mode may be selected individually for different regions within a frame, e.g. on a per slice basis.

Thus before encoding a frame or slice, the encoder is able to decide the motion vector resolution based on factors such as historical statistical data, knowledge of its type of application, multi-pass analysis, or some other such technique. If the encoder decides to use full pixel motion estimation only, the fractional pixel search is skipped. If a scaled motion vector prediction has a fractional part, the prediction is rounded to an integer value.

In further embodiments, the control may optionally be applied separately to the vertical or horizontal component of a vector. This may be useful for encoding screen video that is scaled horizontally or vertically.

In order to represent the motion vector on a reduced resolution scale in units or steps of integer pixels, and thus achieve the associated bitrate savings over conventional codecs, the protocol for signalling the motion vectors will have to be updated for future codec standards. In embodiments this may be implemented as an update to the H.265 (HEVC, High Efficiency Video Coding) standard. For encoding captured screen content, the format of the encoded data 34 will be given a reduced size motion vector field for each motion vector. For an encoded screen capture stream encoded in the integer pixel mode, the relevant data 34 will thus comprise integer motion vectors in bitstream 33 and in embodiments only integer motion vectors in the bitstream 33.

In embodiments this will be optional, with a flag 37 also included in the header 36 to indicate whether fractional pixel (e.g. ¼ pixel) or integer pixel resolution is being used in the encoding of the associated frame or slice (refer again to FIG. 3). If the horizontal and vertical resolutions can be selected separately, two flags 37 will be required per frame or slice.

Alternatively, in embodiments it is not necessary to update the protocol of existing standards to implement integer pixel motion vectors. Instead the motion vectors may be restricted to integer offsets, but these integer motion vectors can nonetheless be represented in the encoded bitstream 33 on the conventional fractional (e.g. ¼ pixel) scale. So in the ¼ pixel resolution case, an offset of one whole pixel will still be represented in the conventional way by a value of 4 (e.g. codeword 00111), but due to the constraint applied at the encoder it would not have the possibility of being, say, ¾ of a pixel represented by a value of 3 (codeword 00100). In this case, the bitrate savings of the integer motion vectors will not be achieved, but processing resources may still be saved by restricting the complexity of the motion vector search to integer offsets.

The following discloses an exemplary embodiment based on an update to the H.265 standard. The modification enables motion vectors to be represented on a reduced, integer pixel scale in the encoded bitstream 33, and adds two flags 37 per slice in the header information 36 of the compressed stream in order to signal the resolution of motion vectors in their horizontal and vertical components.

The modification need not change the syntax or parsing process, but modifies the decoding process by interpreting the motion vector differences as integers and rounding scaled MV predictors to integer values. The modification has been found to increase coding efficiency as much as 7% and on average by about 2% for tested screen content sequences, and it can also reduce the complexity of the encoding and decoding processes.

A high-level indicator is added (at the SPS, PPS, and/or slice header level) to indicate the resolution for interpretation of the motion vectors.

In the decoding process, if the motion vectors are indicated to be at full pixel resolution and a scaled motion vector prediction has a fractional part, the prediction is rounded to an integer value. Motion vector differences are simply interpreted as integer offsets rather than ¼-sample offsets. All other decoding processes remain the same. The parsing process (below the header level) is also unchanged. When the motion vectors are coded at full-sample precision and the input image data uses 4:2:2 or 4:2:0 sampling, the chroma motion vectors can be derived in the usual manner, which will produce ½-sample chroma motion displacements. Alternatively, the chroma motion vectors may also be rounded to integer values.

The scaling mentioned above is something that happens in HEVC (H.265). The idea is that if a motion vector is used for coding some other frame, it can be computed what would be the motion vector that would be equivalent in terms of the relative positioning displacement between: (i) the current picture and (ii) its reference picture. This is based on the relative positioning of the displacement indicated by a motion vector in the co-located part of another picture, and based on the relative positioning displacement between (iii) that picture and (iv) the picture it was referencing as its reference picture. Note that the temporal frame rate of the coded data is not always constant, and also there may be a difference between the order in which pictures are coded in the bitstream and the order in which they are captured and displayed, so these temporal relationships may be computed and then used to scale the motion vector so that it basically represents the same speed of motion in the same direction. This is known as temporal motion vector prediction.

Another possibility could be to disable temporal motion vector prediction whenever using integer motion only. There is already syntax in HEVC that lets the encoder disable the use of that feature. That would be a possible way to avoid needing the decoder to have a special process that operates differently depending on whether the differences are coded as integers or as fractional values. The gain obtained from temporal motion vector prediction may be small (or zero) in these usage cases anyway, so disabling it need not be undesirable.

Regarding the syntax change: a new two-bit indicator will be included, which may be referred to as motion_vector_resolution_control_idc, in the PPS extension to indicate the motion vector resolution control modes. Three modes are defined. When the mode is 0, the motion vectors are encoded at ¼ pixel precision and all decoding processes remain unchanged. When the mode is 1, all of the motion vectors in the slices that refer to the PPS are encoded at full pixel precision. And when the mode is 2, the motion vector resolution is controlled on a slice-by-slice basis by a flag in the slice header. When motion_vector_resolution_control_idc is not present, its value is inferred as 0.

When motion_vector_resolution_control_idc is equal to 2, an additional flag called slice_motion_vector_resolution_flag is signalled in the slice header. When the flag is zero, the motion vectors of this slice are encoded at ¼ pixel precision, and when the flag is 1, the motion vectors are encoded at full pixel precision. When the flag is not present, its value is inferred as equal to the value of motion_vector_resolution_control_idc.

The modified PPS syntax is illustrated as follows:

|  | Descriptor |
|---|---|
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_enabled_flag | u(1) |
|   cabac_init_present_flag | u(1) |
|   ... |  |
|   lists_modification_present_flag | u(1) |
|   log2_parallel_merge_level_minus2 | ue(v) |
|   slice_segment_header_extension_present_flag | u(1) |
|   pps_extension1_flag | u(1) |
|   if( pps_extension1_flag ) { |  |
|   if( transform_skip_enabled_flag ) |  |
|   log2_max_transform_skip_block_size_minus2 | ue(v) |
|   luma_chroma_prediction_enabled_flag | u(1) |
|   motion_vector_resolution_control_idc | u(2) |
|   chroma_qp_adjustment_enabled_flag | u(1) |
|   if( chroma_qp_adjustment_enabled_flag ) { |  |
|   diff_cu_chroma_qp_adjustment_depth | ue(v) |
|   chroma_qp_adjustment_table_size_minus1 | ue(v) |
|   for( i = 0; i <= chroma_qp_adjustment_table_size_minus1; i++ ) { |  |
|     a. cb_qp_adjustment[ i ] | se(v) |
|     b. cr_qp_adjustment[ i ] | se(v) |
|   } |  |
| } |  |
| pps_extension2_flag | u(1) |
| } |  |
| if( pps_extension2_flag ) |  |
| while( more_rbsp_data( ) ) |  |
| pps_extension_data_flag | u(1) |
| rbsp_trailing_bits( ) |  |
| } |  |

The modified slice header syntax is illustrated as follows:

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   ... | |
|   if( slice_type == P || slice_type == B ) { | |
| if( motion_vector_resolution_control_idc == 2) | |
|     a. slice_motion_vector_resolution_flag | u(1) |
| num_ref_idx_active_override_flag | u(1) |
| if( num_ref_idx_active_override_flag ) { | |
|     b. ... | |

It will be appreciated that the above embodiments have been described only by way of example.

For instance, while the above has been described in terms of blocks, this does not necessarily limit to the divisions called blocks in any particular standard. For example the blocks referred to herein may be the divisions called blocks or macroblocks in the H.26x standards.

The scope of the disclosure limited to any particular codec or standard and in general the techniques disclosed herein can be implemented either in the context of an existing standard or an update to an existing standard, whether an H.26x standard like H264 or H.265 or any another standard, or may be implemented in a bespoke codec. Further, the scope of the disclosure is not restricted specifically to any particular representation of video samples whether in terms of RGB, YUV or otherwise. Nor is the scope limited to any particular quantization, nor to a DCT transform. E.g. an alternative transform such as a Karhunen-LoeveTransform (KLT) could be used, or no transform may be used. Further, the disclosure is not limited to VoIP communications or communications over any particular kind of network, but could be used in any network or medium capable of communicating data.

Where it is said that the motion vector offset is restricted or not restricted to an integer number of pixels, or the like, this may refer to the motion estimation in any one or two of the colour space channels, or the motion estimation in all three colour channels.

Further, the claimed embodiments are not limited to an application in which the encoded video and/or screen capture stream is transmitted over a network, nor in which the streams are live stream. For example in another application, the stream may be stored on a storage device such as an optical disk, hard drive or other magnetic storage, or "flash" memory stick or other electronic memory. Note therefore that a screen sharing stream does not necessarily have to mean live sharing (though that is certainly one option). Alternatively or additionally it could be stored for sharing with one or more other users later, or the captured image data may not be shared but rather just recorded for the user who was using the screen at the time. Generally the screen capture could be any moving image data consisting of captured encoder-side screen content, captured by any suitable means (not necessarily by reading from the screen buffer, though that is one option), to be shared with one or more other users (live or not) or simply recorded for the benefit of the capturing user or for just for archive (perhaps never to actually be viewed again as it may turn out).

Note also that the codec is not necessarily limited to encoding only screen capture data and video. In embodiments it may also be capable of encoding other types of moving image data, e.g. an animation. Such other types of moving image data may be encoded in the fractional pixel mode or integer pixel mode. In other embodiments, a specialised codec could be implemented which is dedicated to encoding only screen capture streams, and has a fixed integer pixel resolution.

Further, note that inter frame encoding does not necessarily always have to encode relative to a previous frame, but more generally some codecs may allow encoding relative to a different frame other than the target frame, either preceding or ahead of the target frame (assuming a suitable outgoing buffer).

Further, note that motion vectors themselves may often be encoded differentially. In this case where it is said that the motion vector is restricted to an integer number of pixels, or the like, this means the differentially encoded form of the motion vector is so restricted.

Further, the decoder does not necessarily have to be implemented at an end user terminal, nor output the moving image data for immediate consumption at the receiving terminal. In alternative implementations, the receiving terminal may be an intermediate terminal such as a server running the decoder software, for outputting moving image data to another terminal in decoded or transcoded form, or storing the decoded data for later consumption. Similarly the encoder does not have to be implemented at an end-user terminal, nor encode moving image data originating from the transmitting terminal. In other embodiments the transmitting terminal may for example be an intermediate terminal such as a server running the encoder software, for receiving moving image data in unencoded or alternatively-coded form from another terminal and encoding or transcoding that data for storage at the server or forwarding to a receiving terminal.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the terminals may include an entity (e.g. software) that causes hardware of the user terminals to perform operations, e.g., processors functional blocks, and so on. For example, the terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An encoder system for encoding moving image data comprising a sequence of frames, each frame comprising a plurality of blocks in two dimensions with each block comprising a plurality of pixel values in the two dimensions, and the moving image data comprising screen capture content and/or camera video content, the encoder system comprising:
a processor; and
a computer-readable memory device comprising instructions executable by the processor that configure the encoder system to encode the moving image data to produce encoded data by performing operations that include:
deciding whether or not motion vector ("MV") precision for at least one of the frames is controlled on a region-by-region basis;
if the MV precision for the at least one of the frames is not controlled on a region-by-region basis, deciding whether the MV precision for the at least one of the frames is integer-sample precision or quarter-sample precision;
setting a value of an indicator in a header that applies for the at least one of the frames of the video sequence, the indicator indicating whether or not MV precision for the at least one of the frames is controlled on a region-by-region basis and, if the MV precision for the at least one of the frames is not controlled on a region-by-region basis, further indicating whether the MV precision for the at least one of the frames is integer-sample precision or quarter-sample precision; and
if the MV precision for the at least one of the frames is controlled on a region-by-region basis, for each region of the one or more regions of the at least one of the frames:
deciding, based at least in part on whether content type for the region is screen capture content or camera video content, whether MV precision for the region is integer-sample precision or quarter-sample precision; and
setting a value of a flag in a header for the region, the flag indicating whether the MV precision for the region is integer-sample precision or quarter-sample precision;
the computer-readable memory device further comprising instructions executable by the processor that configure the encoder system to output the encoded data as part of a bitstream, the bitstream including the indicator and, if the MV precision for the at least one of the frames is controlled on a region-by-region basis, a flag for each region of the one or more regions of the at least one of the frames that indicates the MV precision for the region.

2. The encoder system of claim 1, wherein the instructions are executable by the processor to configure the encoder system to select the MV precision individually in each of the two dimensions.

3. The encoder system of claim 1, wherein the blocks are blocks or macroblocks of an H.26x video coding standard.

4. A user terminal comprising the encoder system of claim 1, and a transmitter configured to transmit the encoded data over a network to a remote terminal.

5. The encoder system of claim 1, wherein the header that applies for the at least one of the frames is a sequence parameter set or picture parameter set, wherein the regions are slices, and wherein the header for the region is a slice header.

6. The encoder system of claim 1, wherein the operations further comprise:
receiving, from an application or an operating system, an indication of whether the content type is screen capture content or camera video content;
measuring a performance heuristic that indicates whether the content type is screen capture content or camera video content;
determining historical statistical data that indicates whether the content type is screen capture content or camera video content; or
performing multi-pass analysis to determine whether the content type is screen capture content or camera video content.

7. The encoder system of claim 1, wherein the MV precision is integer-sample precision if the content type is screen capture content, and wherein the MV precision is quarter-sample precision if the content type is camera video content.

8. In a computer system comprising one or more processing units and memory, a method comprising:
encoding frames of a video sequence to produce encoded data, each of the frames including one or more regions, wherein the encoding includes:
deciding whether or not motion vector ("MV") precision for at least one of the frames is controlled on a region-by-region basis;
if the MV precision for the at least one of the frames is not controlled on a region-by-region basis, deciding whether the MV precision for the at least one of the frames is integer-sample precision or quarter-sample precision;
setting a value of an indicator in a header that applies for the at least one of the frames of the video sequence, the indicator indicating whether or not MV precision for the at least one of the frames is controlled on a region-by-region basis and, if the MV precision for the at least one of the frames is not controlled on a region-by-region basis, further indicating whether the MV precision for the at least one of the frames is integer-sample precision or quarter-sample precision; and
if the MV precision for the at least one of the frames is controlled on a region-by-region basis, for each region of the one or more regions of the at least one of the frames:
deciding, based at least in part on whether content type for the region is screen capture content or camera video content, whether MV precision for the region is integer-sample precision or quarter-sample precision; and setting a value of a flag in a header for the region, the flag indicating whether the MV precision for the region is integer-sample precision or quarter-sample precision; and outputting the encoded data as part of a bitstream, the bitstream including the indicator and, if the MV precision for the at least one of the frames is controlled on a region-by-region basis, a flag for each region of the one or more regions of the at least one of the frames that indicates the MV precision for the region.

9. The method of claim 8, wherein the header that applies for the at least one of the frames is a sequence parameter set or picture parameter set, wherein the regions are slices, and wherein the header for the region is a slice header.

10. The method of claim 8, further comprising:
receiving, from an application or an operating system, an indication of whether the content type is screen capture content or camera video content.

11. The method of claim 8, further comprising, during the encoding:
measuring a performance heuristic that indicates whether the content type is screen capture content or camera video content.

12. The method of claim 8, further comprising, during the encoding:
determining historical statistical data that indicates whether the content type is screen capture content or camera video content.

13. The method of claim 8, further comprising, during the encoding:
performing multi-pass analysis to determine whether the content type is screen capture content or camera video content.

14. The method of claim 8, wherein the MV precision is integer-sample precision if the content type is screen capture content, and wherein the MV precision is quarter-sample precision if the content type is camera video content.

15. A computer program product embodied on a computer-readable memory device and executable to perform operations comprising:
encoding frames of a video sequence to produce encoded data, each of the frames including one or more regions, wherein the encoding includes:
deciding whether or not motion vector ("MV") precision for at least one of the frames is controlled on a region-by-region basis;
if the MV precision for the at least one of the frames is not controlled on a region-by-region basis, deciding whether the MV precision for the at least one of the frames is integer-sample precision or quarter-sample precision;
setting a value of an indicator in a header that applies for the at least one of the frames of the video sequence, the indicator indicating whether or not MV precision for the at least one of the frames is controlled on a region-by-region basis and, if the MV precision for the at least one of the frames is not controlled on a region-by-region basis, further indicating whether the MV precision for the at least one of the frames is integer-sample precision or quarter-sample precision; and if the MV precision for the at least one of the frames is controlled on a region-by-region basis, for each region of the one or more regions of the at least one of the frames:
deciding, based at least in part on whether content type for the region is screen capture content or camera video content, whether MV precision for the region is integer-sample precision or quarter-sample precision; and
setting a value of a flag in a header for the region, the flag indicating whether the MV precision for the region is integer-sample precision or quarter-sample precision; and outputting the encoded data as part of a bitstream, the bitstream including the indicator and, if the MV precision for the at least one of the frames is controlled on a region-by-region basis, a flag for each region of the one or more regions of the at least one of the frames that indicates the MV precision for the region.

16. The computer program product of claim 15, wherein the header that applies for the at least one of the frames is a sequence parameter set or picture parameter set, wherein the regions are slices, and wherein the header for the region is a slice header.

17. The computer program product of claim 15, wherein the operations further comprise:
receiving, from an application or an operating system, an indication of whether the content type is screen capture content or camera video content.

18. The computer program product of claim 15, wherein the operations further comprise, during the encoding:
measuring a performance heuristic that indicates whether the content type is screen capture content or camera video content.

19. The computer program product of claim 15, wherein the operations further comprise, during the encoding:
determining historical statistical data that indicates whether the content type is screen capture content or camera video content.

20. The computer program product of claim 15, wherein the operations further comprise, during the encoding:
determining historical statistical data that indicates whether the content type is screen capture content or camera video content.

21. The computer program product of claim 15, wherein the MV precision is integer-sample precision if the content type is screen capture content, and wherein the MV precision is quarter-sample precision if the content type is camera video content.

* * * * *